(12) United States Patent
Winterhalter et al.

(10) Patent No.: US 8,322,927 B2
(45) Date of Patent: Dec. 4, 2012

(54) FLUID DYNAMIC BEARING

(75) Inventors: Olaf Winterhalter, Epfendorf (DE);
Andreas Kull, Donaueschingen (DE)

(73) Assignee: Minebea Co., Ltd., Nagano-Ken (JP)

( * ) Notice: Subject to any disclaimer, the term of this patent is extended or adjusted under 35 U.S.C. 154(b) by 626 days.

(21) Appl. No.: 12/386,718

(22) Filed: Apr. 22, 2009

(65) Prior Publication Data
US 2009/0274402 A1 Nov. 5, 2009

(30) Foreign Application Priority Data

Apr. 30, 2008 (DE) .................. 10 2008 021 514

(51) Int. Cl.
*F16C 32/06* (2006.01)

(52) U.S. Cl. .................. 384/119; 384/100; 384/132

(58) Field of Classification Search .................. 384/100, 384/107, 111, 113, 114, 115, 119, 130, 131, 384/132
See application file for complete search history.

(56) References Cited

U.S. PATENT DOCUMENTS

| | | | | |
|---|---|---|---|---|
| 2,526,594 A | * | 10/1950 | Voysey | .......................... 384/132 |
| 5,716,141 A | * | 2/1998 | Chen | .............................. 384/114 |
| 6,250,807 B1 | | 6/2001 | Mori | |
| 6,467,962 B1 | * | 10/2002 | Suzuki et al. | .................. 384/100 |
| 2004/0184689 A1 | | 9/2004 | Asada | |
| 2005/0111769 A1 | * | 5/2005 | Haga | .............................. 384/119 |
| 2006/0088233 A1 | | 4/2006 | Ando | |
| 2007/0076992 A1 | * | 4/2007 | Hong et al. | ................... 384/119 |
| 2008/0181542 A1 | * | 7/2008 | Gomyo | ......................... 384/100 |

FOREIGN PATENT DOCUMENTS

| DE | 10239650 | 3/2004 |
|---|---|---|
| JP | 2004183865 | 7/2004 |

* cited by examiner

*Primary Examiner* — Daniel P. Stodola
*Assistant Examiner* — Matthew R. McMahon
(74) *Attorney, Agent, or Firm* — Cooper & Dunham LLP

(57) ABSTRACT

A fluid dynamic bearing having at least one first bearing part as well as a second bearing part that are rotatably supported with respect to one another about a rotational axis and separated from one another by a bearing gap filled with bearing fluid. Associated bearing surfaces of the bearing parts form a first and a second radial bearing that are marked by grooved bearing patterns disposed on at least one bearing surface. Between the radial bearings, there is a separator gap having an enlarged gap distance compared to the bearing gap. The ends of the grooved bearing patterns of the radial bearings adjoining the separator gap penetrate into the separator gap. This measure prevents the creation of negative pressure at the ends of the grooved bearing patterns, as a result of which the formation of air bubbles is also reduced.

16 Claims, 3 Drawing Sheets

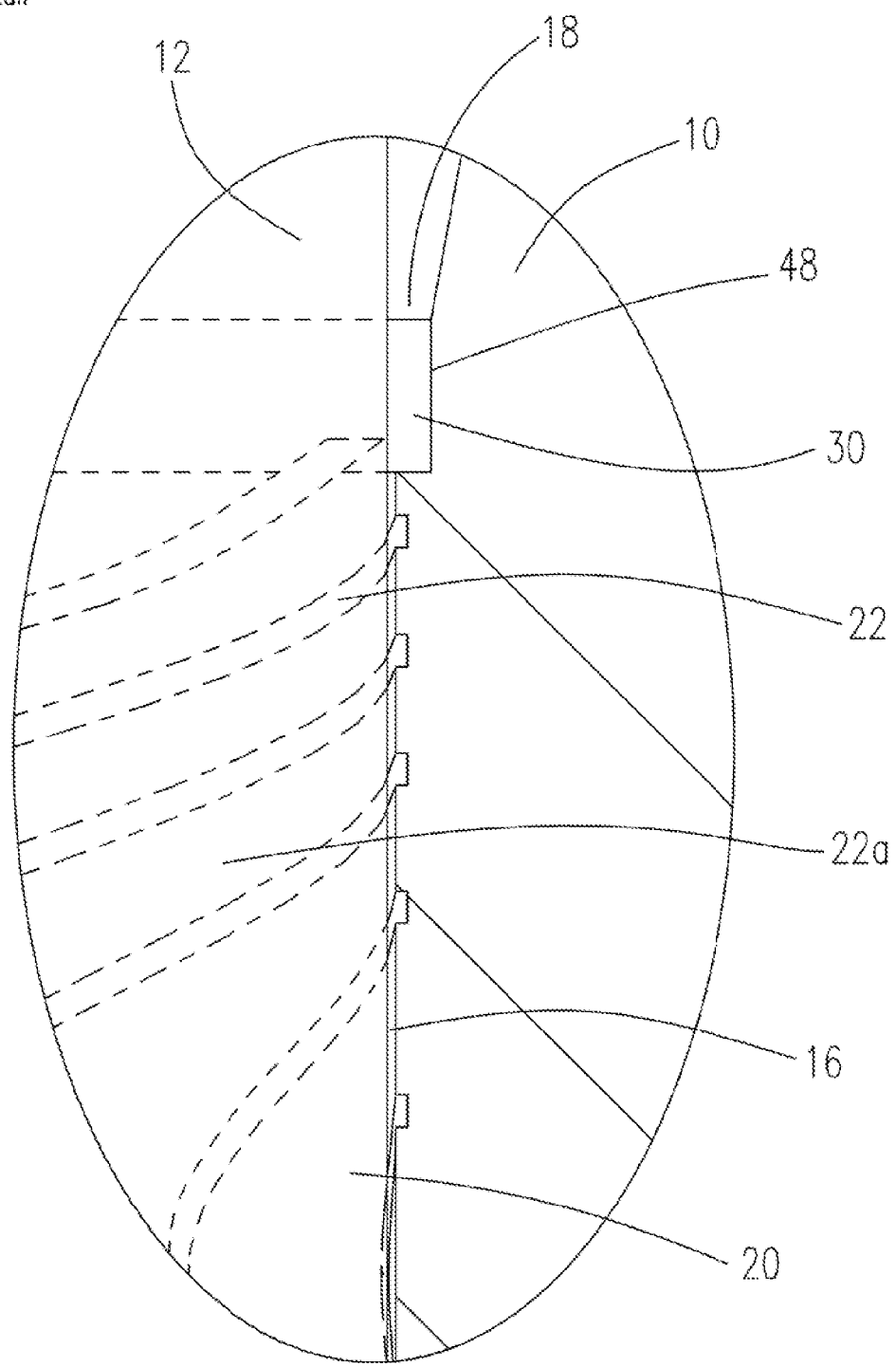

FLUID DYNAMIC BEARING

BACKGROUND OF THE INVENTION

Figure 1:
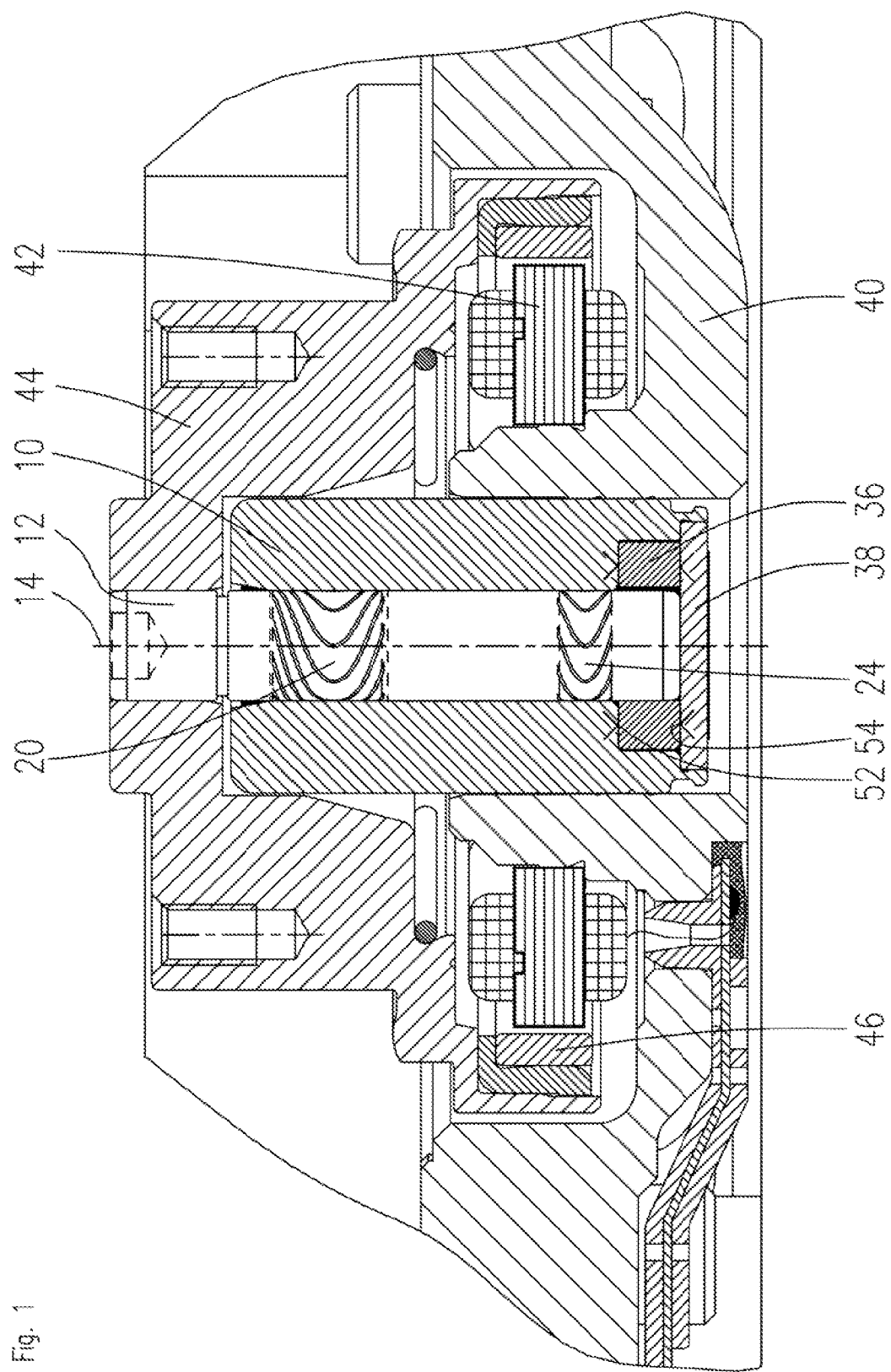

The invention relates to a fluid dynamic bearing according to the characteristics outlined in the preamble of claim 1. These kinds of fluid dynamic bearings are particularly used for the rotational support of a spindle motor for driving disk drives or fans.

PRIOR ART

A known embodiment of a fluid dynamic bearing system for the rotational support of a spindle motor is revealed in DE 102 39 650 B3. The bearing system comprises a shaft and a bearing bush that has an axial bearing bore for receiving the shaft. The bearing surfaces of the shaft and bearing bush are separated from one another by a thin, concentric bearing gap filled with bearing fluid. The shaft rotates freely in the stationary bearing bush and, together with the bearing bush, preferably forms two fluid dynamic radial bearings disposed at a distance to one another. The radial bearings are marked by grooved bearing patterns that are preferably provided on the surface of the bearing bore. A typical bearing for a miniature spindle motor has an axial length, for example, of 15 mm and a shaft diameter of a few millimeters. In this kind of bearing, the grooved bearing patterns have a typical depth of some 4 to 20 micrometers, the gap distance of the bearing gap being approximately 2 to 10 micrometers. As soon as the shaft is set in rotation, fluid dynamic pressure is built up in the bearing gap due to the grooved bearing pattern, thus giving the bearing its load bearing capacity. Between the radial bearings, there is a gap having a larger spacing between the shaft and the bearing bush, called the separator gap. Compared to the bearing gap, the separator gap has a significantly larger gap distance of some 20 to 50 micrometers, resulting in less bearing friction in this region.

The shaft carries a hub on which, for example, the storage disks of a hard disk drive are disposed. Displacement of the described arrangement along the rotational axis is prevented by appropriately designed fluid dynamic axial bearings. The fluid dynamic thrust bearings are preferably formed by the two end faces of a thrust plate preferably disposed, but not necessarily, at the end of the shaft, one end face of the thrust plate being associated with a corresponding end face of the bearing bush and the other end face being associated with the inner end face of a cover. The cover forms a counter bearing to the thrust plate and seals the open end of the bearing system and prevents air from penetrating into the bearing gap filled with bearing fluid. In the illustrated bearing system, a liquid bearing fluid, such as a bearing oil, is used.

A typical characteristic of this kind of bearing system is that the upper radial bearing has a greater axial length than the lower radial bearing. Although this goes to lessen frictional losses in the bearing, stability is reduced and non-repeatable runout (NRRO) is increased accordingly.

SUMMARY OF THE INVENTION

The object of the invention is to improve a fluid dynamic bearing so as to ensure high stability and low non-repeatable runout (NRRO).

This object has been achieved according to the invention by a fluid dynamic bearing comprising at least one first bearing part and a second bearing part that are rotatably supported about a rotational axis with respect to one another and separated from one another by a bearing gap filled with bearing fluid, associated bearing surfaces of the bearing parts forming a first and a second radial bearing that are each marked by grooved bearing patterns disposed on at least one bearing surface, a separator gap having an enlarged gap distance compared to the bearing gap being provided between the radial bearings. The invention is characterized in that a transition gap having an enlarged gap distance compared to the bearing gap is disposed adjoining the bearing gap, that the ends of the grooved bearing patterns of the first radial bearing adjoining the transition gap penetrate into the transition gap, that a sealing gap having an enlarged gap distance compared to the bearing gap is disposed adjoining the transition gap, and that the smallest gap distance of the sealing gap corresponds to the gap distance of the transition gap.

Advantageous embodiments and further developments of the invention are the subject matter of the subordinate claims.

In a preferred embodiment of the invention, the bearing system according to the invention is that the first radial bearing has a greater axial length than the second radial bearing. Although frictional losses in the bearing are thereby lessened, stability is reduced and non-repeatable runout (NRRO) is increased accordingly. In order to maintain sufficient bearing stability, provision is made in the invention that a specific ratio of the outside diameter of the shaft $OD_{shaft}$ and the axial length of the second radial bearing $L_{radial2}$ is not exceeded. According to the invention the following should apply:

$$OD_{shaft}/L_{radial2} < 2.2$$

Additionally, when the outside diameter of the second bearing part is less than or equal to 2.50 mm, the following should apply:

$$OD_{shaft}/L_{radial2} < 2.00$$

In a preferred embodiment of the invention, the ends of the grooved bearing patterns of the radial bearings adjoining the separator gap penetrate into the separator gap. This measure goes to prevent negative pressure being created at the ends of the grooved bearing patterns, as a result of which the formation of air bubbles is also reduced. The larger gap distance of the separator gap and the direct connection to the grooved bearing patterns result in an improved flow rate of the bearing fluid through the grooved bearing patterns.

In a preferred embodiment of the invention, a transition gap having a larger gap distance than the bearing gap adjoins the open end of the bearing gap. The ends of the grooved bearing patterns of the first radial bearing adjoining the transition gap penetrate into the transition gap. This measure goes to counteract the creation of negative pressure in this region as well, and the consequent formation of air bubbles, since the larger gap distance of the transition gap ensures an improved flow rate of bearing fluid through the grooved bearing patterns. The transition gap is preferably made just as deep as the bearing grooves, although it may also be deeper than the bearing grooves. Preferably, the depth of the transition gap is 1-3 times the depth of the grooved bearing grooves. Adjoining the transition gap, there is a sealing gap having a gap distance greater than the bearing gap, the gap distance preferably increasing to a taper.

The other end of the bearing gap ends in a recess of the first bearing part in which a thrust plate is accommodated. The ends of the grooved bearing patterns of the second radial bearing adjoining the recess penetrate into the recess. Here again the creation of negative pressure and the consequent formation of air bubbles is thus counteracted. The transition between the bearing gap and the recess may have a chamfer. The grooved bearing patterns then end in the region of the chamfer.

According to a preferred embodiment of the invention, the first radial bearing adjoining the transition gap has a greater axial length than the second radial bearing adjoining the recess. This means that the first radial bearing is made "stronger" than the second radial bearing and takes on a preponderant share of the bearing loads. The first radial bearing preferably has asymmetric grooved bearing patterns, such as sine-shaped or herringbone grooved bearing patterns, the sections of the grooved bearing patterns adjoining the transition gap being made longer than the sections of the grooved bearing patterns adjoining the separator gap. The longer sections of the grooved bearing patterns generate a greater pumping effect than the shorter sections of the grooved bearing patterns, thus generally resulting in a pumping effect on the bearing fluid directed towards the interior of the bearing, which, on the whole, increases the pressure level in the bearing gap. This goes to reduce the risk of negative pressure zones in the bearing gap. The second radial bearing may be made substantially symmetric, or it may also be slightly asymmetric.

In the recess of the first bearing part, a thrust plate connected to the second bearing part is disposed. The second bearing part and the thrust plate are preferably integrally formed as one piece. The thickness of the thrust plate can hence be kept very small. This makes it possible for the axial span of the bearing to be made longer and the sealing gap at the open end of the bearing to be extended. The ratio of the outside diameter of the thrust plate to its thickness is preferably greater than 2.5.

The groove that forms the transition gap or the undercut that forms the separator gap may be advantageously fabricated together with the grooved bearing patterns using an electrochemical machining process. This makes it possible to machine the bearing parts easily and at low cost.

The invention is now described in more detail on the basis of a preferred embodiment with reference to the following drawings. Further characteristics, advantages and possible applications of the invention can be derived from this.

FIG. 1 shows a section through a spindle motor having a fluid dynamic bearing system according to the invention.

Figure 2:
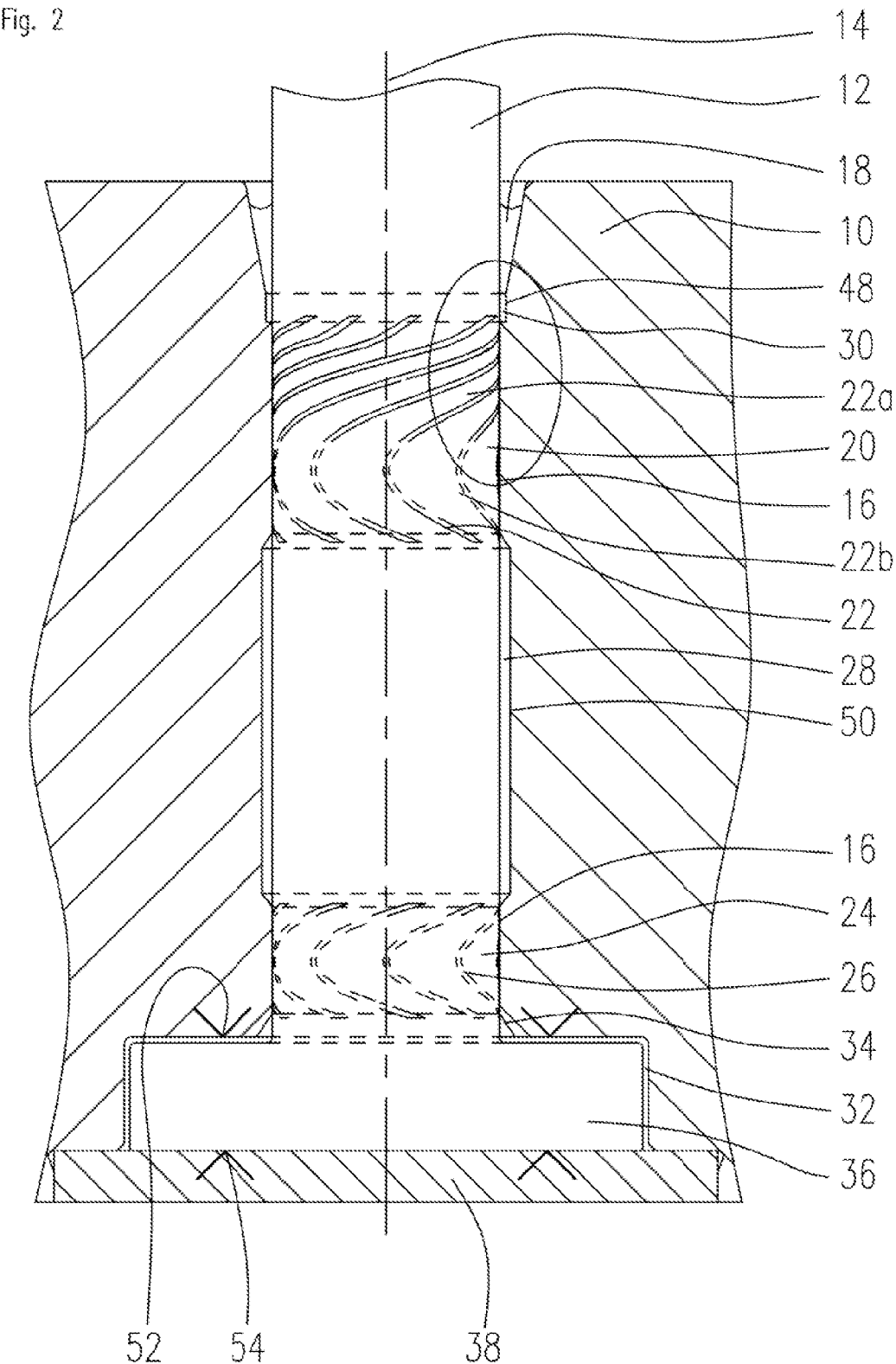

FIG. 2 schematically shows an enlarged view of the bearing system according to the invention.

FIG. 2a shows an enlarged view of the encircled portion indicated in FIG. 2.

DESCRIPTION OF A PREFERRED
EMBODIMENT OF THE INVENTION

FIG. 1 shows a section through a spindle motor having a fluid dynamic bearing system according to the invention. The spindle motor comprises a stationary baseplate 40 on which an annular stator arrangement 42 that forms part of an electromagnetic drive system is disposed. A first, stationary bearing part 10 taking the form of a bearing bush is fixed in a sleeve-shaped recess in the baseplate 40. The stationary bearing part 10 has an axial cylindrical bore in which a second, rotatable bearing part 12, such as a shaft, is rotatably supported. The spindle motor is rotatably supported by means of a fluid dynamic bearing. A bearing gap 16 filled with a bearing fluid is defined between the inside diameter of the bearing bush 10 and the outside diameter of the shaft 12. The fluid dynamic bearing comprises two radial bearings and two axial bearings. The two radial bearings are formed by respective bearing surfaces of the shaft 12 and the bearing bush 10. A first axial bearing is formed by a thrust plate 36 disposed at the lower end of the shaft 12 and a cover plate 38 that seals the lower end of the bearing bush 10 so that no bearing oil can leak out of the bearing. A second axial bearing is formed by opposing bearing surfaces of the thrust plate 36 and the bearing bush 10. Both the thrust plate 36 as well as the cover plate 38 are disposed in a recess 32 of the bearing bush 10.

The free end of the shaft 12 carries a hub 44 that, together with the shaft 12, forms the rotor of the spindle motor. At the inner, lower edge of the hub 44 an annular rotor magnet 46 having a plurality of pole pairs is disposed, the annular rotor magnet 46 lying opposite the stator 42. The stator 42 is separated from the rotor magnet 46 by an air gap and an alternating electric field is applied to the stator, so that the rotor is set in rotation.

FIG. 2 shows a schematic, enlarged section through the fluid dynamic bearing system according to the invention. The individual parts and particularly the gap dimensions are exaggerated for the sake of clarity and are not shown to scale. The bearing system comprises the bearing bush 10 which has a central bore. The shaft 12 is inserted in the bore of the bearing bush 10, the diameter of the shaft being slightly smaller than the diameter of the bore of the bearing bush 10. A bearing gap 16 thus remains between the surfaces of the bearing bush 10 and the shaft 12, two fluid dynamic radial bearings 20, 24 being disposed along this bearing gap 16 and the shaft 12 being rotatably supported in the bearing bush 10 about a rotational axis 14 by means of the two fluid dynamic radial bearings 20, 24. The first radial bearing 20 as well as the second radial bearing 24 are marked by grooved bearing patterns 22 or 26. The bearing gap 16 is filled with an appropriate bearing fluid. On rotation of the shaft 12 in the bearing bush 10, the grooved bearing patterns 22, 26 generate a pumping effect on the bearing fluid found in the bearing gap 16, thus giving the radial bearings 20, 24 their load bearing capacity. The first radial bearing 20 is made much larger than the second radial bearing 24 and comprises asymmetric grooved bearing patterns 22 that have longer sections 22a and short sections 22b. The longer sections 22a generate a greater pumping effect on the bearing fluid in the bearing gap 16 than the short sections 22b and force the bearing fluid into the interior of the bearing. The open end of the bearing gap 16 is sealed from above by a sealing gap 18 that is formed, for example, as a tapered capillary seal and proportionally filled with bearing fluid. This sealing gap prevents bearing fluid from leaking out of the bearing gap 16. Between the two radial bearings 20, 24, there is a region of the bearing gap that has a larger gap distance, called the separator gap 28. The separator gap 28 is partly formed by an undercut 50 disposed at the inside circumference of the first bearing part 10. The undercut 50 may, for example, may be fabricated using an electrochemical machining process or a material removal process. The thrust plate 36 is disposed at the lower end of the shaft 12. The thrust plate 36 is preferably integrally formed as one piece with the shaft 12 and need not be very thick. Since the thrust plate 36 has a reduced thickness, the sealing gap 18, for example, may be made longer and thus have a greater volume, which goes to increase the supply of bearing fluid and thus the useful life of the bearing as well. The thrust plate 36 is accommodated in a recess 32 of the bearing bush 10 and comprises two opposing annular disk-shaped bearing surfaces, the respective axial bearings 52, 54 that prevent displacement of the shaft 12 along the rotational axis 14. In the transition region to the recess 32, the bearing gap may be provided with a chamfer 34.

According to the invention, the two radial bearings 20 and 24 adjoin the separator gap 28. The grooved bearing patterns 22 and 26 of the radial bearings 20, 24 end directly in the separator gap 28, i.e. they penetrate into the enlarged gap region of the separator gap.

Moreover, a transition gap 30 is disposed between the end of the bearing gap 16 and the sealing gap 18, which, compared to the bearing gap, has an enlarged gap distance between the first and the second bearing part. The transition gap 30 is partly formed by a groove 48 disposed on the inside circumference of the first bearing part 10, where the groove 48 may be formed using an electrochemical or a mechanical machining process. The ends of the grooved bearing patterns 22 of the first radial bearing 20 adjoining the transition gap 30 penetrate into the transition gap. The gap distance of the transition gap may, for example, be 10 to 40 µm, preferably about 12 µm. The axial length of the transition gap 30 may, for example, be 100 µm, at an overall length of the bearing of, for example, 15 mm.

The depth of the grooved bearing patterns (22) of the first radial bearing (20) is preferably about 7 µm. As seen from FIG. 2a, the depth of the transition gap is 1-3 times the depth of the grooved bearing patterns (22).

Furthermore, the ends of the grooved bearing patterns 26 adjoining the chamfer 34 or the recess 32 penetrate into the chamfer 34 or the recess 32.

Since all four ends of the two grooved bearing patterns 22 and 26 penetrate into regions having a larger gap distance, the flow of bearing fluid in the grooved bearing patterns is improved and the creation of negative pressure is prevented. This results in reduced outgassing of air dissolved in the bearing fluid and fewer air bubbles are formed in the bearing gap.

IDENTIFICATION REFERENCE LIST

10 First bearing part
12 Second bearing part
14 Rotational axis
16 Bearing gap
18 Sealing gap
20 First radial bearing
22 Grooved bearing pattern
22a Longer bearing groove section
22b Shorter bearing groove section
24 Second radial bearing
26 Grooved bearing pattern
28 Separator gap
30 Transition gap
32 Recess
34 Chamfer
36 Thrust plate
38 Cover plate
40 Baseplate
42 Stator
44 Hub
46 Rotor magnet
48 Groove
50 Undercut
52 Axial bearing
54 Axial bearing

The invention claimed is:

1. A fluid dynamic bearing comprising:
at least one first bearing part (10) and a second bearing part (12) that are rotatably supported about a rotational axis (14) with respect to one another and separated from one another by a bearing gap (16) filled with bearing fluid, associated bearing surfaces of the bearing parts (10, 12) forming a first (20) and a second radial bearing (24) that are each marked by grooved bearing patterns (22, 24) disposed on at least one bearing surface, wherein said grooved bearing patterns extend within the bearing gap, a separator gap (28) having an enlarged gap distance compared to the bearing gap (16) being provided between the radial bearings (20, 24), characterized in that
a transition gap (30) having an enlarged gap distance compared to the bearing gap is disposed adjoining the bearing gap (16),
the ends of the grooved bearing patterns (22) of the first radial bearing (20) adjoining the transition gap (30) extend axially into the transition gap (30),
a sealing gap (18) having an enlarged gap distance compared to the bearing gap (16) is disposed adjoining the transition gap (30), and
the smallest gap distance of the sealing gap (18) corresponds to the gap distance of the transition gap (30).

2. A fluid dynamic bearing according to claim 1, characterized in that the ratio between the outside diameter of the second bearing part (12) and the axial length of the second radial bearing (24) is less than 2.20.

3. A fluid dynamic bearing according to claim 2, characterized in that for outside diameters of the second bearing part (12) that are less than or equal to 2.50 mm, the ratio between the outside diameter of the second bearing part (12) and the axial length of the second radial bearing (24) is less than 2.00.

4. A fluid dynamic bearing according to claim 1, characterized in that the ends of the grooved bearing patterns (22, 26) of the radial bearings (20, 24) adjoining the separator gap (28) extend axially into the separator gap (28).

5. A fluid dynamic bearing according to claim 1, characterized in that the bearing gap (16) ends in a recess (32) of the first bearing part (10), and the ends of the grooved bearing patterns (26) of the second radial bearing (24) adjoining the recess extend axially into the recess (32).

6. A fluid dynamic bearing according to claim 5, characterized in that the first bearing part has a chamfer (34) in the transition region to the recess, and the ends of the grooved bearing patterns (26) of the second radial bearing (24) in the region of the chamfer (34) extend axially into the recess (32).

7. A fluid dynamic bearing according to claim 5, characterized in that the first radial bearing (20) adjoining the transition gap (30) has a greater axial length than the second radial bearing (24) adjoining the recess (32).

8. A fluid dynamic bearing according to claim 1, characterized in that the first radial bearing (20) has asymmetric grooved bearing patterns (22), the sections (22a) of the grooved bearing patterns (22) adjoining the transition gap (30) being made longer than the sections (22b) of the grooved bearing patterns (22) adjoining the separator gap (28).

9. A fluid dynamic bearing according to claims 1, characterized in that the second radial bearing (24) is made substantially symmetric.

10. A fluid dynamic bearing according to claim 1, characterized in that a thrust plate (36) connected to the second bearing part (12) is disposed in a recess (32), the ratio of the outside diameter of the thrust plate (36) to its thickness being greater than 2.50.

11. A fluid dynamic bearing according to claim 10, characterized in that the second bearing part (12) and the thrust plate (36) are integrally formed as one piece.

12. A fluid dynamic bearing according to claim 1, characterized in that the transition gap (30) is partly formed by a groove (48) disposed on the inside circumference of the first bearing part (10), the groove (48) being fabricated by an electrochemical machining process.

13. A fluid dynamic bearing according to claim 1, characterized in that the separator gap (28) is partly formed by an undercut (50) disposed on the inside circumference of the first bearing part (10), the undercut (50) being fabricated by an electrochemical machining process.

14. A fluid dynamic bearing according to claim 1, characterized in that the transition gap (30) has a depth which is one to three times the depth of the grooved bearing patterns (22).

15. A fluid dynamic bearing according to claim 1, characterized in that the transition gap (30) is partly formed by a groove (48) disposed on the inside circumference of the first bearing part (10), the groove (48) being fabricated by a mechanical machining process.

16. A spindle motor having a fluid dynamic bearing according to claim 1, the spindle motor further comprising a stator including an annular stator arrangement, the annular stator arrangement forming at least part of an electromagnetic drive system, and a rotor affixed to the second bearing part.

* * * * *